United States Patent
Cuomo et al.

(10) Patent No.: US 6,272,539 B1
(45) Date of Patent: Aug. 7, 2001

(54) METHODS, SYSTEMS AND COMPUTER PROGRAM PRODUCTS FOR DETERMINING AND VISUALLY REPRESENTING A USER'S OVERALL NETWORK DELAY IN COLLABORATIVE APPLICATIONS

(75) Inventors: Gennaro A. Cuomo, Apex; Karen Ruth Kluttz; Sandeep Singhal, both of Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/193,957

(22) Filed: Nov. 18, 1998

(51) Int. Cl.[7] .................................................. G06F 13/00
(52) U.S. Cl. .............................. 709/223; 713/502
(58) Field of Search .................................. 709/223, 224; 713/502

(56) References Cited

U.S. PATENT DOCUMENTS

| | | | |
|---|---|---|---|
| 5,095,444 | * | 3/1992 | Motles ............................ 713/502 X |
| 5,399,976 | * | 3/1995 | Wardle ............................... 324/621 |
| 5,521,907 | * | 5/1996 | Ennis, Jr. et al. ................... 370/253 |
| 6,016,424 | * | 1/2000 | Hicks et al. ......................... 455/414 |

FOREIGN PATENT DOCUMENTS

0559351 A1 * 9/1993 (EP) .

* cited by examiner

*Primary Examiner*—Thomas M. Heckler
(74) *Attorney, Agent, or Firm*—Myers Bigel Sibley & Sajovec; Gregory M. Doudnikoff

(57) ABSTRACT

Methods, systems and computer program products for determining an estimated overall delay value associated with a user's communications with a site in a network and providing the user with a visual representation of this estimated overall delay value are provided. The estimated overall delay value may be determined by estimating the round-trip delay associated with the user's communications with the network site, estimating the transmission delay associated with the user's communications with the network site, and then determining the estimated overall delay value based on the estimated round-trip delay and the estimated transmission delay. The user may be provided the visual representation of the estimated overall delay value by generating an indicia corresponding to the estimated overall delay value and displaying this indicia on the user's display device.

37 Claims, 7 Drawing Sheets

METHODS, SYSTEMS AND COMPUTER PROGRAM PRODUCTS FOR DETERMINING AND VISUALLY REPRESENTING A USER'S OVERALL NETWORK DELAY IN COLLABORATIVE APPLICATIONS

FIELD OF THE INVENTION

The present invention relates generally to collaborative applications, and more particularly, to estimating a user's overall network delay when using collaborative applications.

BACKGROUND OF THE INVENTION

Over the last decade, data communication networks in general, and the Internet in particular, have gained continually increasing acceptance as a mass communications media. This recognition of data communication networks as viable media for communication, along with the proliferation of hardware capable of providing access to such networks to a broad base of users, has created opportunities for vastly expanded use of data communication networks such as the Internet for a wide range of new or expanded commercial purposes.

By way of background, a data communication network refers to a grouping of resources which interconnect and provide for communications between various computers, telephones, and other network users that are generally located at geographically separate locations. Such networks can range from small local area networks interconnecting computers within a building to large distributed networks spanning countries or continents. Data communication networks are generally comprised of a group of switches, which are referred to as nodes, network users, who reside at or are electronically connected to the nodes, and a plurality of transmission links which interconnect the nodes. The nodes serve to provide users access to the network, and provide means for routing data transmitted across the network. The transmission links which interconnect these nodes carry the communications signals, and may comprise one or more different types of communications media such as wire, cable, radio, satellite or fiber optic communications links.

As indicated above, both the size and number of data communication networks have proliferated in recent years, with the Internet serving as the most notable example of the trend toward distributed computing and information sharing. The Internet is a worldwide decentralized network of computers having the ability to communicate with each other, thereby allowing users to communicate and otherwise interact across multiple networks. The World Wide Web ("Web") was created in the early 1990's, and is comprised of "server" computers which are connected to the Internet (hereinafter "servers") with stored hypertext documents or Web pages. These Web pages are accessible by client devices (hereinafter "clients") using browser programs (hereinafter "browsers") such as Netscape Navigators® (Netscape Communications Corporation, Mountain View, Calif.) and Internet Explorer® (Microsoft Corporation, Redmond, Wash.). Browsers typically provide a graphical user interface ("GUI") for retrieving and viewing server Web pages.

In many respects, the Internet and other data communication networks are well-suited for business communications. For instance, the Internet allows for efficient real-time exchange of information such as documents, photographs, graphics, audio files, video clips and other data intensive communications in a manner that is often faster, cheaper and of better quality than traditional business communications media. Furthermore, the Internet allows for personalized and/or adaptive information exchange which is not possible with many conventional forms of communications such as television and radio. However, while the Internet and other data communication networks have many advantages over traditional business communications media, it is also a relatively new communications media which many potential users may be hesitant to try and which most actual users may not fully understand. Thus, these networks may not fulfill their potential as a media for business communications, as these potential and actual users may not have confidence in these networks to the same degree that they have confidence in traditional business communications media.

By way of example, when telephone users experience a poor connection, which may result from equipment failure, poor weather, atmospheric effects, or other interference, the volume typically drops precipitously or static appears on the line and the parties to the call realize that they have a bad connection. Given their familiarity with the technology, however, telephone users experiencing such a bad connection understand that it is likely an isolated incident and will hang up and reinitiate the call. Moreover, telephone users are generally forgiving when these situations occur and continue to use the telephone with expectations that such poor connections will, at most, be an occasional occurrence. In contrast, while user expectations for on-line communications generally are high, most users have limited understanding regarding when and why performance will differ. As such, most users typically cannot distinguish between a poor connection (e.g., a connection disrupted by equipment failures) and, for example, a connection carrying data intensive communications (such as graphics) that may exhibit what on the surface appears to be degraded communication quality. Thus, inexperienced users may question the reliability of data communication networks because they fail to understand how distance, processor speed, transmission link capacity, the type of communication (e.g., text versus video) and other client-server and network parameters affect the performance of on-line communications.

This lack of user sophistication may have the potential to inhibit the use of data communication networks for business communications, as new and inexperienced users whose expectations are not met may conclude that on-line communications are not sufficiently reliable for business communications. This is particularly true because often the Internet and other data communication networks provide no feedback regarding either the cause of, or the probability of a solution to, what the user perceives as a "glitch" or problem with the network connection. Thus, many on-line communication users may reject the Internet for such business communications, such that these networks do not reach their full potential as a media for business communications. Accordingly, there exists a need for ways to improve the confidence of user's of data communication networks in the reliability of such networks as a media for business communications.

SUMMARY OF THE INVENTION

In view of the above limitations associated with efforts to expand the use of data communication networks for business communications, it is an object of the present invention to provide methods, systems and computer program products which serve to increase the confidence of data communication network users in the reliability of such networks.

Another object of the present invention is to provide methods and systems for providing data communication network users with network information.

It is still a further object of the present invention to provide methods and systems which provide data communication network users with network information in a readily understandable format. Other objects, features and advantages of the present invention will become apparent upon reading the following detailed description and appended claims and upon reference to the accompanying drawings.

The above-mentioned objects of the present invention are provided by methods, systems and computer program products which determine and visually represent network information to users of the network. Specifically, these methods, systems and computer program products estimate overall network delay information for one or more users of the network, and periodically provide this overall delay information to network users via the graphical user interface at the users' computer monitors.

In one embodiment of the methods of the present invention, an estimated overall delay value associated with a user's communications with a site in a network is determined, and the user is then provided a visual representation of this estimated overall delay value. The estimated overall delay value may be determined by estimating the round-trip delay associated with the user's communications with the network site, estimating the transmission delay associated with the user's communications with the network site, and then determining the estimated overall delay value based on the estimated round-trip delay and the estimated transmission delay. In this embodiment, the round-trip delay may be estimated by measuring the time required to send a message from the user to the network site to provide a first time value, measuring the time required to send a message from the network site to the user to provide a second time value, and calculating the estimated round-trip delay value as the sum of the first time value and the second time value. Similarly, the transmission delay may be estimated by estimating one or more bandwidth values associated with the user's communications with the network site, estimating a first message size associated with a communication which is to be transmitted from the user to the network site, estimating a second message size associated with the response to the communication from the network site to the user and estimating the transmission delay based on the one or more estimated bandwidth values, the estimated first message size and the estimated second message size. In this embodiment, the bandwidth may be estimated, for example, by transmitting a plurality of messages of various lengths from the user to the network site, measuring the delay before receiving a response from the network site to each of the plurality of messages, and estimating the bandwidth available for the user's communications with the network site based on the differences in the measured delays associated with receiving the responses to the messages of various lengths. The user may be provided the visual representation of the estimated overall delay value by generating an indicia corresponding to the estimated overall delay value and displaying this indicia on the user's display device.

In another embodiment of the present invention, methods of displaying information to a user of a first data processing system are provided when the first data processing system is communicating with a second data processing system over a communications network. Pursuant to these methods, a overall delay indicator associated with communications between the first data processing system and the second data processing system (where the communications are originated by an application executing on the first data processing system) is displayed so as to provide a user of the application executing on the first data processing system an indicator of expected communications delay for communications originated by the application executing on the first data processing system. In this embodiment, a predefined set of overall delay indicators may be provided, and after an estimate of overall delay associated with communications, originated by the application, from the first data processing system to the second data processing system is obtained, one of the predefined set of overall delay indicators is selected based on the obtained overall delay estimate. This selected one of the predefined set of overall delay indicators may then be displayed on the display device associated with the first data processing system.

In a further embodiment of the methods of the present invention, the steps of estimating the round-trip delay, estimating the transmission delay and determining the estimated overall delay value are performed periodically. In this embodiment, each of the periodically determined estimated overall delay values may be adjusted based on an average of prior of the periodically determined estimated overall delay values. Moreover, systems and computer program products for implementing the above-described methods are also disclosed herein.

Accordingly, the methods, systems and computer program products of the present invention provide users of data communications network with overall network delay information in a readily understandable format. By providing such information, these methods, systems and computer program products should increase user understanding regarding expected system performance and the reason for any delays experienced, thereby increasing the confidence of such users in the reliability of such networks as a media for business communications.

BRIEF DESCRIPTION OF THE DRAWINGS

FIG. 1 illustrates the connections between a representative client and server over a network;

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by those of skill in the art, the present invention may be embodied as methods or devices. Accordingly, the present invention may take the form of an entirely hardware embodiment, an entirely software embodiment or an embodiment combining software and hardware aspects.

The present invention provides methods, systems and computer program products for determining network delay and visually representing such information to users of collaborative network applications. In a preferred embodiment, these methods, systems and computer program products estimate the overall delay for a user's communications over a network by periodically measuring the time required for certain messages to travel from a network user (such as a client) to another network user (such as a server) and vice versa, and by periodically measuring the response time to other messages as a means of estimating the available network bandwidth. The overall delay information is then displayed, and periodically updated, on the user's computer display.

Figure 1:
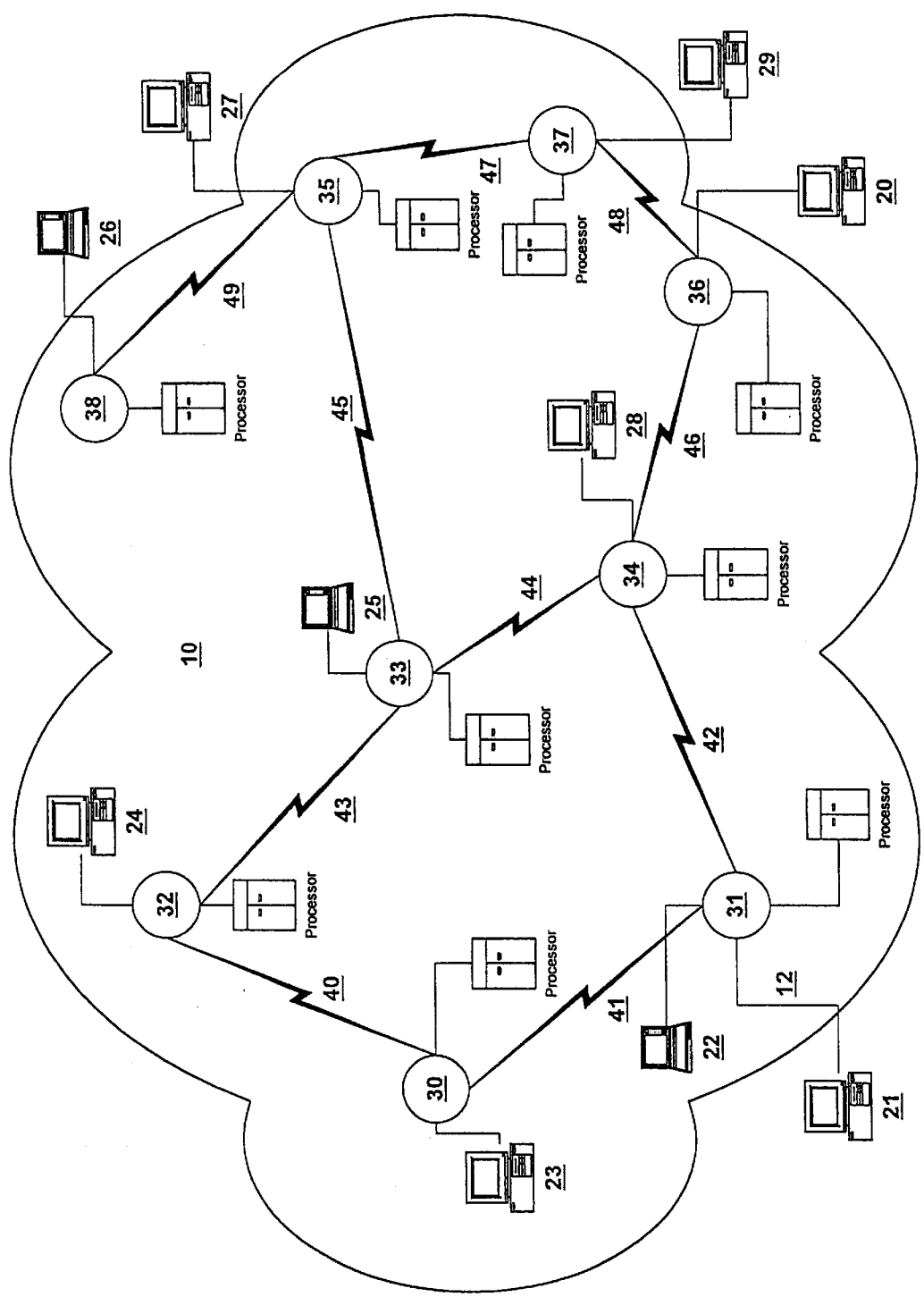
FIG. 1 illustrates a representative network in which the methods and systems of the present invention be implemented.

FIG. 1 illustrates a data communication network 10, along with representative nodes, users and transmission links in which the methods, systems and computer program products of the present invention may be utilized. As illustrated in FIG. 1, the data communication network 10 interconnects a number of nodes 30, 31, 32, 33, 34, 35, 36, 37, 38 to each other, and also interconnects these nodes with various other nodes which comprise network 10 (which are not shown in FIG. 1). Various network users, which may comprise any of a variety of electronic devices, are typically connected to one or more of the nodes, such as users 20, 21, 22, 23, 24, 25, 26, 27, 28, 29 in FIG. 1. As will be understood by those of skill in the art, users 20, 21, 22, 23, 24, 25, 26, 27, 28, 29 may comprise clients, servers and/or various other types of network users. Nodes 30, 31, 32, 33, 34, 35, 36, 37, 38 may comprise one or more various different types of nodes, such as hosts, end nodes, network nodes and the like. As will be understood by those of skill in the art, network 10 may include hundreds or thousands of nodes interconnected by various communications links, and may comprise a single network or a network comprised of numerous sub-network structures, such as wide area networks, local area networks, X.25 telecommunications networks, etc., which are interconnected by gateways and/or other communications links. Network 10 may operate using any of a variety of network communications architectures, such as IBM's System Network Architecture (SNA) or variations thereof. In one embodiment of the present invention, network 10 comprises the Internet, which, as discussed above, is a worldwide decentralized computer network comprising thousands of sub-networks.

As illustrated in the example network of FIG. 1, nodes 30, 31, 32, 33, 34, 35, 36, 37, 38 are connected to various of the other nodes comprising network 10 by communication links 40, 41, 42, 43, 44, 45, 46, 47, 48, 49. As will be understood by those of skill in the art, these communications links may comprise any appropriate communications media, such as wire, cable, radio, satellite or fiber optic communications links, and which may comprise a single communications channel or multiple communications channels. Herein, references to a "network communications path" refer to both communications path through the network which comprise a single communications link and paths which comprise multiple communications links.

Figure 2:
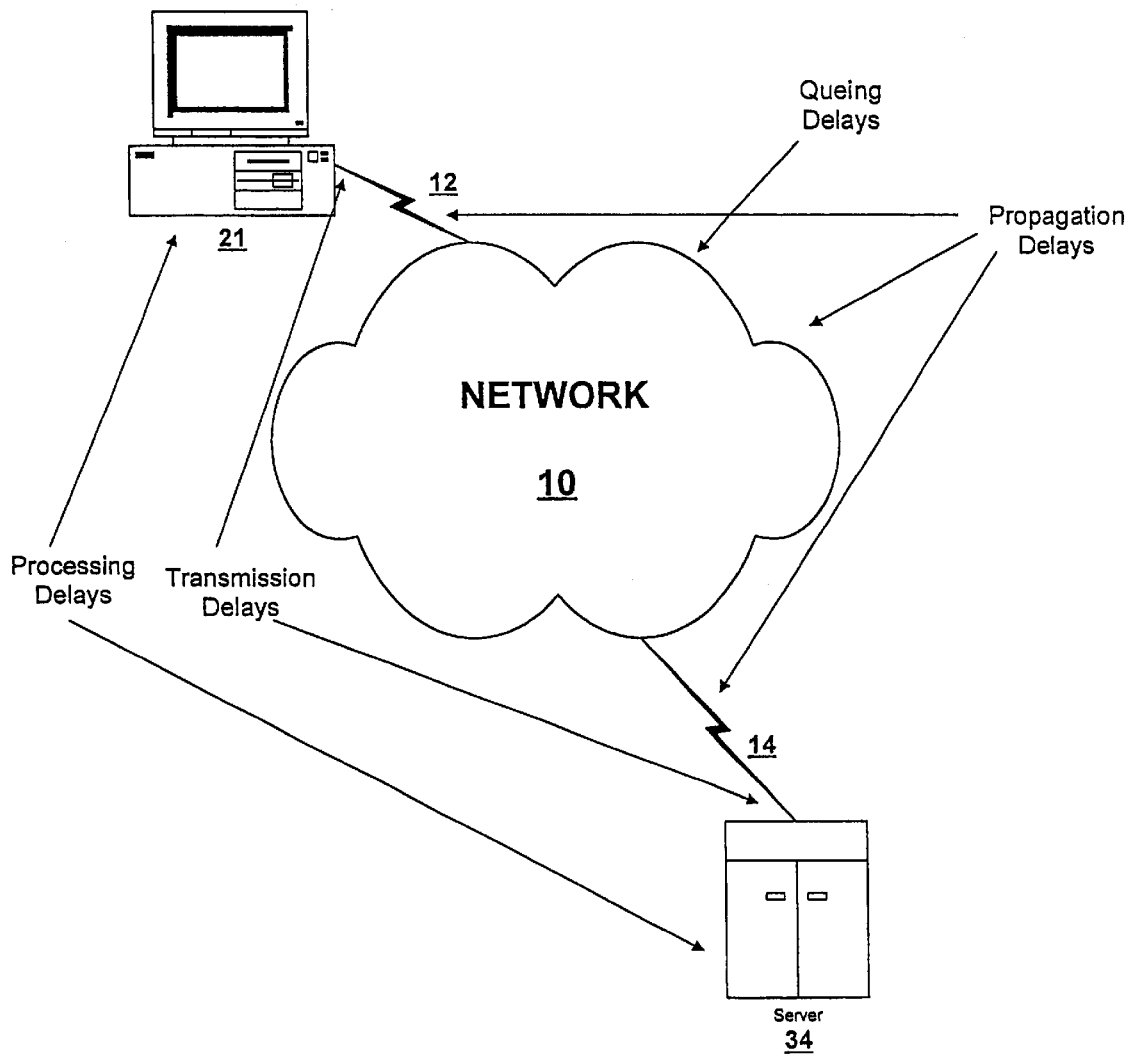
FIG. 2 illustrates the connections between a representative client and server over a network.

FIG. 2 illustrates, in simplified form, how a network user such as client 21 communicates with another network user (server 34) across a network. As illustrated in FIG. 2, user 21 is connected to the network 10 by a transmission link 12. Typically, this transmission link provides a connection for passing electronically stored information between user 21 and a network node such as node 31 (see FIG. 1). When a client such as user 21 in FIG. 2 sends a message or request, for example, to a server such as server 34, this message typically travels from his computer or terminal as information bits. These bits travel via transmission link 12 to network 10 (in the case illustrated in FIG. 2 where user 21 resides outside network 10), where they are then re-transmitted across network 10 by any of a variety of network communications paths to another network user, such as server 34, which contains the web site, chat room or other network application or site with which user 21 is communicating. Once the server 34 receives these information bits, it processes the message and provides a response, if appropriate, back across network 10.

As will be understood by those of skill in the art, when user 21 transmits a message to server 34 there will be a delay before user 21 receives a response to the message from server 34. This delay, which herein is referred to as the "overall delay", is the amount of time passing between the moment when a network user such as client 21 first starts transmitting a message to another network user such as server 34 until the moment the response sent by server 34 is fully received by client 21. A number of different delays contribute to the overall delay, including propagation delays, queuing delays, processing delays and transmission delays. FIG. 2 depicts where these delays typically occur along the network communications path. As discussed below, these delays may vary widely based on a number of client, server, and network parameters.

The propagation delay refers to the amount of time physically required to send an information bit from the client to the server and vice-versa ignoring queuing delays, transmission delays and various other delays. While in some instances the server 34 may be in the room next to the client 21, in other instances, the server 34 may be half-way across the country or half-way around the world from the client 21. Thus, the propagation delay associated with communications over the network will obviously vary depending on the physical length of the network communication path connecting the client 21 and server 34. When the client and server are widely separated, or in instances in which the bits travel over satellite communications links (which typically require that the information travel tens of thousands of miles), these propagation delays alone may be on the order of ¼ of a second or more, which typically will be noticeable to users.

In addition to propagation delays, an information bit traveling between client 21 and server 34 will also typically experience "queuing" delays. These queing delays refer to the time during which the information bit resides in memory at an intermediate node in a network, waiting for transmission capacity to become available which will transmit the information bit to the next intermediate node in the network. This type of delay is primarily a function of the transmission resources available to the network and the amount of network traffic.

A third type of delay associated with data communications networks is "processing" delay, which includes the time required to format messages at both the client and server into information bits for transmission across the network (and, if necessary, the reverse process), as well as the time required to process and respond to the request or message at the server. These delays may vary significantly, as the time required to process and respond to a request will vary with a number of factors, such as the amount of calculations required, the amount of data which must be retrieved from memory, and the type of memory (e.g., RAM, ROM, hard drive, tape, compact disc, etc.) in which the requested data is stored.

Finally, the "transmission" delay refers to the delay resulting from the fact that the communications path between the client and the server has a limited capacity, such that some finite delay will exist between the time the server (or the client) transmits the first information bit of the message and the last information bit which is part of the message. The length of this transmission delay is primarily dependent on the transmission data rate of the various communications links in the network and on the length of the message which is to be transmitted.

The overall delay experienced by a network user with respect to a particular message generally refers to the sum of the propagation, queuing, processing and transmission delays associated with sending that message and receiving a response thereto. Unfortunately, however, overall delay, if large, or in many cases, if even perceptible, is a problem for many network users. Almost invariably, users find this delay frustrating, and in many instances, confusing, as it may often be unclear as to whether or not the message was properly transmitted and received by the server. In such instances, a user may often re-send the same message or request multiple times, wasting network transmission resources, needlessly incurring additional processing at the server and bogging communications down further. However, pursuant to the teachings of the present invention, means for providing users easily decipherable information regarding overall delay are provided, which should help lower user frustration levels and help avoid instances where users inefficiently, and often confusingly, retransmit the same message multiple times.

The present invention will now be described with respect to FIG. 3 and FIG. 4, which are flowcharts illustrating the operation of a data processing system for determining and visually representing the overall delay experienced by network users of collaborative applications. It will be understood that each block in these flowcharts, and combinations of blocks in these flowcharts, can be implemented by computer program instructions. These program instructions may be provided to a processor such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 3:
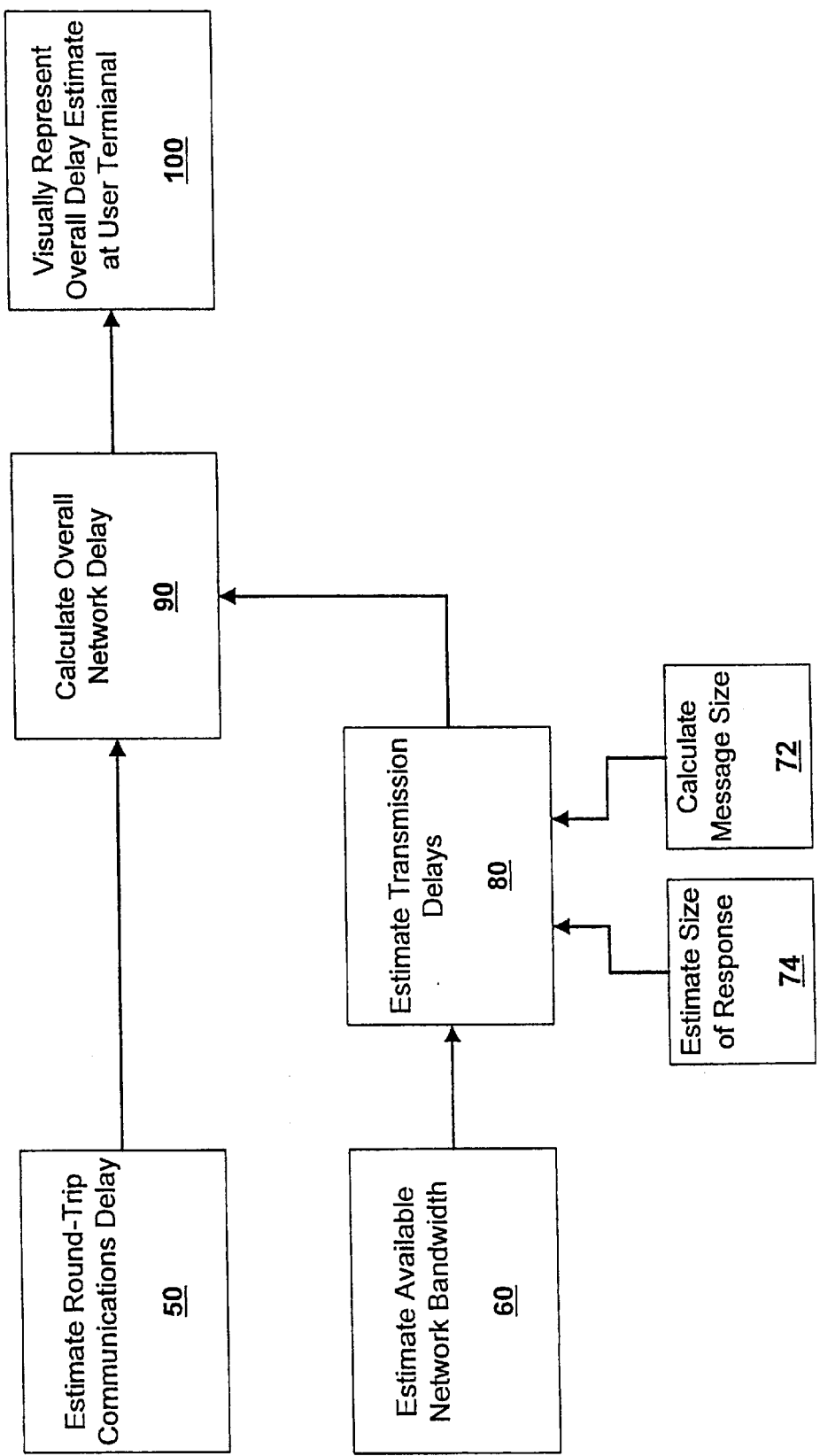
FIG. 3 is a flow chart describing operations according to one embodiment of the methods, systems and computer program products of the present invention.

FIG. 3 illustrates a generalized embodiment of the present invention that determines overall network delay information and visually represents this information at a user terminal.

As illustrated in FIG. 3, overall delay information (block 90) may be calculated as a function of the estimated round-trip communications delay (block 50) and the estimated transmission delays (block 80). In terms of the various network delays discussed above, the estimate of the round-trip communications delay 50 generally corresponds to an estimate of the sum of the propagation, queuing and processing delays. However, as discussed further herein, the round-trip communications delay may also be approximated based solely on the propagation and queuing delays. The estimated transmission delays (block 80) refers to an estimate of the transmission delays associated with transmitting a particular message and transmitting the response thereto. As shown in FIG. 3, the estimated transmission delays (block 80) are determined by estimating the available network transmission capacity or "bandwidth" (block 60), and determining or estimating the size (e.g., in bits) of the message which will be sent from the client (block 72) and the size of the response from the server (block 74). The one-way transmission delays may then be computed by dividing the estimates of message size by the estimate of network bandwidth (block 80). As indicated in FIG. 3, once an estimate of overall delay is calculated (block 90), it is provided to the user via a visual representation at the user terminal (block 100). As discussed further herein, this visual representation can take a wide variety of forms, such as a numerical output, a graph, a meter or other indicia which indicate either the exact, or a more generalized, estimate of the overall delay.

The round-trip communications delay (block 50) and the estimate of available network bandwidth (block 60) may be determined in a variety of different ways. For instance, in many networks, information regarding network traffic, communications capacity, queuing delays and other such parameters are collected and distributed throughout the network to facilitate optimized network routing. Accordingly, determination of estimates for the round-trip communications delay and the network bandwidth may, in some networks, may be accomplished by combining already available information regarding network status with information regarding the size of the messages to be transmitted to calculate estimates of the various delay parameters for a particular set of users communicating across the network. In other instances, only some of the information may be available, and in these situations, measurements of the remaining information may be obtained by measuring or estimating the actual delay times associated with messages transmitted between the network users.

Figure 4:
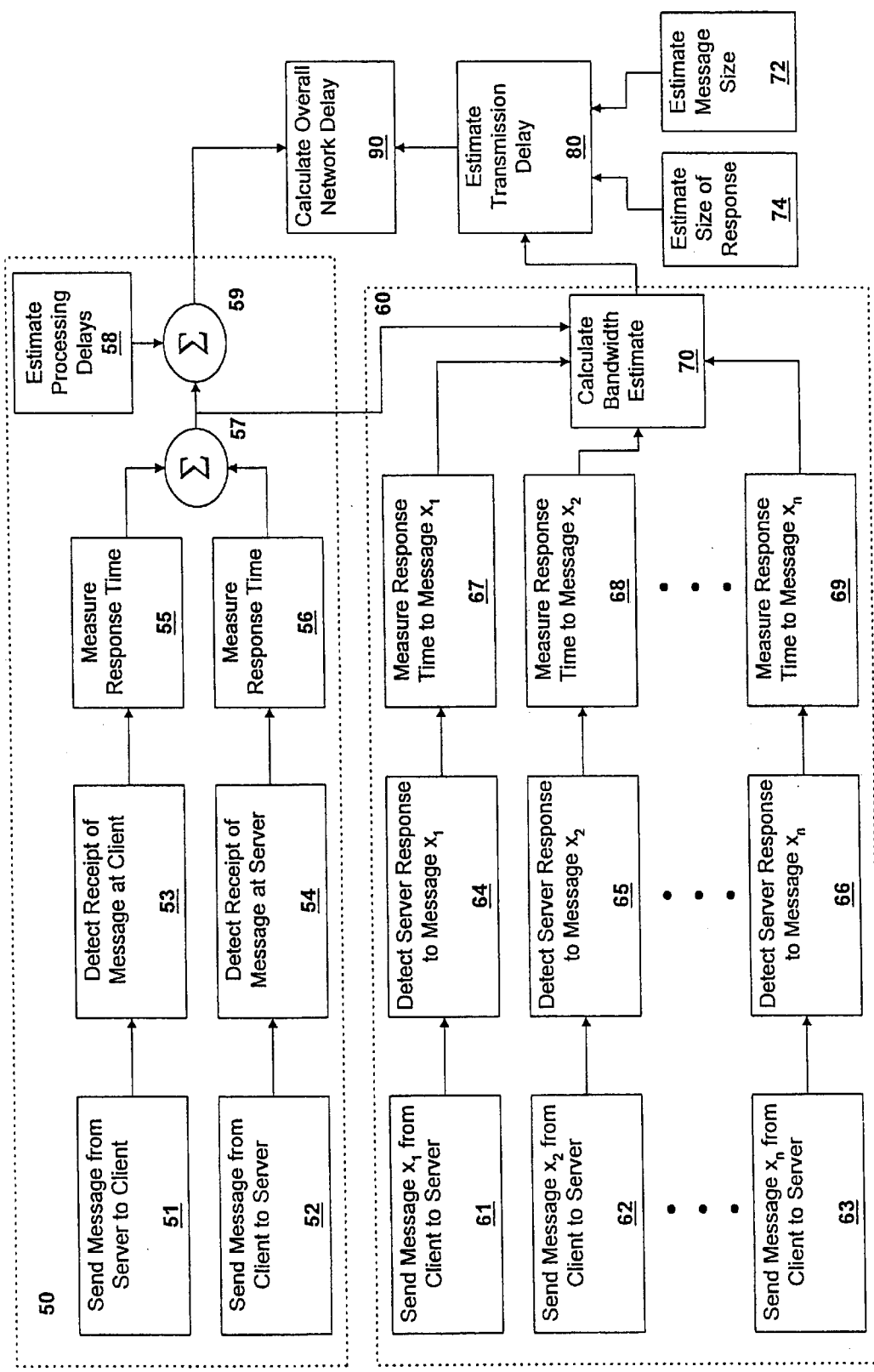
FIG. 4 is a flow chart further illustrating operations of a preferred embodiment of the methods, systems and computer program products of the present invention.

The flow chart of FIG. 4 illustrates a preferred embodiment of the present invention in which estimates of the round-trip communications delay and the available network bandwidth are obtained by measuring the delays associated with specific messages that are transmitted between two users such as client 21 and server 34 in FIG. 2. As illustrated in FIG. 4, the round-trip communications delay (block 50) may be estimated by transmitting a pair of messages, one from client to server and the other from server to client (blocks 52 and 51). The server and client monitor for the receipt of these messages (blocks 54 and 53), and measure the delay between the time each message was transmitted and received (blocks 55 and 56). Preferably, the server incorporates the measured delay in a message and returns this information to the client (if the system for estimating overall delay is resident at the client). These two estimates may then be summed 57 to provide an estimate of the propagation and queuing delays. As shown in FIG. 4, the estimate of the combined propagation/queuing delay may then optionally be added 59 to an estimate of the processing delay (block 58) to provide a more refined estimate of the round-trip communications delay. The estimates of the processing delay can be obtained in a wide variety of ways, such as, for example, by tracking historical delay information, monitoring the type of information requested and estimating processing delay based on this information or by the transmission of a message from the server with an estimate of delay.

As will be understood by those of skill in the art, instead of sending two messages to estimate the round-trip delay as illustrated in FIG. 4, it is also possible to send a single message which requests a response, and estimate the round-trip delay as the time passing between the transmission of the message and receipt of the response. Generally speaking, this embodiment will result in longer estimates of the round-trip delay, as the time required to process and respond to the message at the server is included in the overall delay. Thus, in situations where no other information is available regarding the magnitude of this "processing" delay, this embodiment may be preferred. However, in situations where it is possible to obtain better estimates of the processing delay, the embodiment of FIG. 4, or some other embodiment that more accurately accounts for the expected or actual processing delay, will generally be preferred.

As shown in FIG. 4, the available network bandwidth estimate (block 60) may be obtained by transmitting a series of messages $x_1$, $x_2$ through $x_n$, from the client to the server (blocks 61, 62, 63). Preferably, each of these messages $x_1$, $x_2$ through $x_n$ is of a different length (i.e., in terms of how many information bits it includes), and requests a response (of typically the same length message) from the server. After sending each message, the client monitors for the arrival of a response (blocks 64, 65, 66) and measures the total (round-trip) delay associated with receiving a response to each such message $x_1$, $x_2$ through $x_n$ (blocks 67, 68, 69). As will be understood by those of skill in the art, the differences in the time it took to receive a response to messages $x_1$, $x_2$ through $x_n$ can be attributed to the differences in time it took to transmit the variable length messages over the network. Based on these differences, an estimate of the available network bandwidth can be calculated (block 70). Note that as shown in FIG. 4, this calculation generally can be simplified by using the measured information regarding the processing and queing delays 57 in the network bandwidth calculation.

By way of example, a simplified calculation of available network bandwidth might proceed as follows. Assume that two round-trip probes $x_1$ and $X_2$ were sent, of sizes 100 and 1000 bits, respectively. Assume further that the round-trip delays for these two probes are respectively 1 second and 3 seconds. An estimate of network bandwidth would be computed as follows:

delta number of bits/delta transmission time=(1000−100)/(3−1)= 900/2=450

More generally, if multiple probes are performed, then the available bandwidth may be computed by associating each probe with a 2-dimensional data point (transmission time, number of bits) and computing the line of best fit among these data points. The available bandwidth is estimated to be the slope of this line. Computation of this line of best fit is well established in the prior art and will not be discussed further herein. As will be described below (FIG. 5), additional pre-processing may be performed to filter the data points produced by the probes to, for example eliminate the effects of short term spikes in network behavior.

The above-described method of estimating network bandwidth is not precise, as factors other than the variation in the size of messages $x_1$, $x_2$ through $x_n$ could contribute to any differences measured in the time passing between sending each message and receiving a response thereto. For instance, messages $x_1$, $x_2$ through $x_n$ could be routed over different transmission paths across the network, and differences in the propagation and queuing delays over these various paths could account for some of the differences in response time. Similarly, generally messages $x_1$, $x_2$ through $x_n$ will not be transmitted at exactly the same time, and thus even if routed over the same transmission path through the network, response time could still be affected by variations in total network traffic over the period messages $x_1$, $x_2$ through $x_n$, and the responses thereto, are traversing the network. However, despite these and other potential sources of error, in many situations, relatively accurate estimates of network bandwidth can be obtained via the operations shown in blocks 61–70 of FIG. 4. Moreover, as discussed herein, the effects of differences in network routing paths and/or network traffic characteristics can be dampened by periodically estimating network bandwidth and averaging over some number of these estimates to filter out short-term spikes in network behavior.

As is also illustrated in FIG. 4, the estimate of available bandwidth (block 70) can be used to determine an estimate of the expected transmission delay (block 80). In a preferred embodiment of the present invention, this estimate of the transmission delay (block 80) is determined by summing the estimated size (in bits) of the message to be transmitted (block 72) divided by the estimate of the network bandwidth (which is measured in bits per second) and the estimated size (in bits) of the response from the server (block 74) divided by the estimate of network bandwidth. The expected overall delay may then be calculated (block 90) as the sum of the round-trip delay and the transmission delay. As discussed herein, this overall delay information may then be provided to the user.

As indicated in FIG. 4, one possible method of estimating the bandwidth is to measure the delay associated with round-trip probes (i.e., the delay from the time a message is sent until a response to the message is received). In this embodiment, the bandwidth estimate reflects some sort of average of the bandwidth available for messages transmitted in both the client-to-server direction and the server-to-client direction. However, it will be appreciated that instead of using a series of round-trip probes, alternatively it would be possible to send two series of one way probes, one series which went from the client-to-server and the other from the server-to-client. In this manner it is possible to obtain bandwidth estimates for each direction through the network. In situations where the these bandwidth values differ significantly, and where the size of the messages sent by the client differ from the responses sent by the server, this latter approach will typically provide more accurate estimates of both network bandwidth and the expected transmission delays.

In a preferred embodiment of the present invention, the overall delay information is periodically determined, so that the overall delay information provided to the user, at the very least, reflects changes in network performance resulting from changes in traffic, equipment failures, atmospheric effects or any other factors which impact network delay and throughput. As will be understood by those of skill in the art, network delay may vary significantly, in certain circumstances, with even small changes in network traffic, and hence in many networks frequent updates regarding expected overall delay are necessary if the information is to have any reliability. In a preferred embodiment of the present invention, the overall delay information is updated to provide a new estimate of overall delay associated with every message sent from the client (although round-trip delay and network bandwidth may be computed less frequently), as this allows the overall delay estimate to take into account the transmission delays associated with transmitting the message from the client to the server and in transmitting the response from the server to the client. However, typically it will not be necessary to estimate the round-trip delay and network bandwidth with every message, as sufficient accuracy will often be obtainable if this information is estimated periodically (e.g., every minute) or upon sensing a significant change in network characteristics.

While it will often be desirable to estimate overall delay with respect to most or all of the messages sent by a user, in many situations it may be distracting to visually represent all of this information to the user. Accordingly, in an alternative embodiment of the present invention, overall delay information is only visually provided to users when the overall delay estimate exceeds a threshold value. This threshold value will likely differ depending upon the network characteristics, the application(s) involved and a variety of other factors. Moreover, these thresholds might also dynamically change depending upon the server or other network site the user was communicating with. Thus, for example, one plausible set of thresholds would be to publish overall delay information to the user if the estimated overall delay (i) exceeded 30 milliseconds for communications with a site on a local area network, (ii) exceeded 100 milliseconds for communications with a site within the organization, or (iii) exceeded 500 milliseconds for communications over the Internet.

As will be understood by those of skill in the art, in many situations one or two of the various types of delays (e.g., propagation delay, queuing delay, processing delay, transmission delay) may dominate the overall delay calculation in particular networks and/or applications. Accordingly, to obtain estimates of overall delay according to the methods, systems and computer program products of the present invention, it may not be necessary to consider all of these delays. As such, it will be understood that the term "overall delay" as used herein is not limited to the sum of the various delays associated with receiving a response to a message sent over a data communication network, but is also intended to encompass the sum of any subset of these delays. Thus, it should be recognized that the present invention, as described in the claims appended hereto, describe methods, systems and computer program products for determining and visually representing expected delay values to network users, regardless of whether or not the particular delay value serves as a proxy for, or comprises, overall delay. Moreover, in some instances it may be difficult or impractical to accurately estimate one or more components of the overall delay, such as the processing delay. Thus it will be understood in particular that the methods, systems and computer program products of the present invention are intended to encompass systems which obtain and visually represent to network users estimates of the overall delay that both consider, and which don't consider, the effects of processing delay.

As will also be understood by those of skill in the art, estimates of the various delays which comprise the overall delay may be obtained in a wide variety of ways. For example, with some applications, it may be possible to assume a fixed value of a particular delay (e.g., propagation delay in a local area network) or for some other parameter that impacts overall delay (e.g., message size). The method selected for estimating the particular delays/parameters will normally depend on the accuracy of the delay estimates required and the ease of implementing the method in the particular network.

It will also be understood that, in many situations, it may not be possible to precisely estimate overall delay, as necessary information may not be readily available to the system or computer program product which determines the estimate. For instance, if the system for estimating overall delay resident at the user terminal, the system will typically not have any information regarding the size (in bits) of a server's response to a particular message. Moreover, while this information theoretically could be obtained from the server via a supplementary message which preceded the server's response, the delays associated with receiving and processing such a message would often be prohibitive. When such information is not available, it will generally be necessary to estimate values for the information to permit calculation of overall delay.

In the simplest embodiment of the present invention, a fixed value may always be assumed for the missing information. For instance, the system might assume that every response from the server was 1,000,000 bits in length. Typically, however, more refined estimates can be provided, based on the type of server accessed, the length of last response from the server (or an average of some number of previous responses), the type of information requested by the message from the client, or other suitable criteria. Once again, the criteria selected will typically depend on the degree of accuracy desired and the relative ease of implementation.

As discussed above, in an embodiment of the present invention, the message "probes" that are sent for estimating the round-trip communications delay and the available network bandwidth are sent periodically. In this embodiment of the invention, an averaging function may also be included that facilitates smoothing out any short-term spikes in network behavior which may add error in the overall delay estimation. The block diagram of FIG. 5 depicts a system that includes means for performing such averaging.

Figure 5:
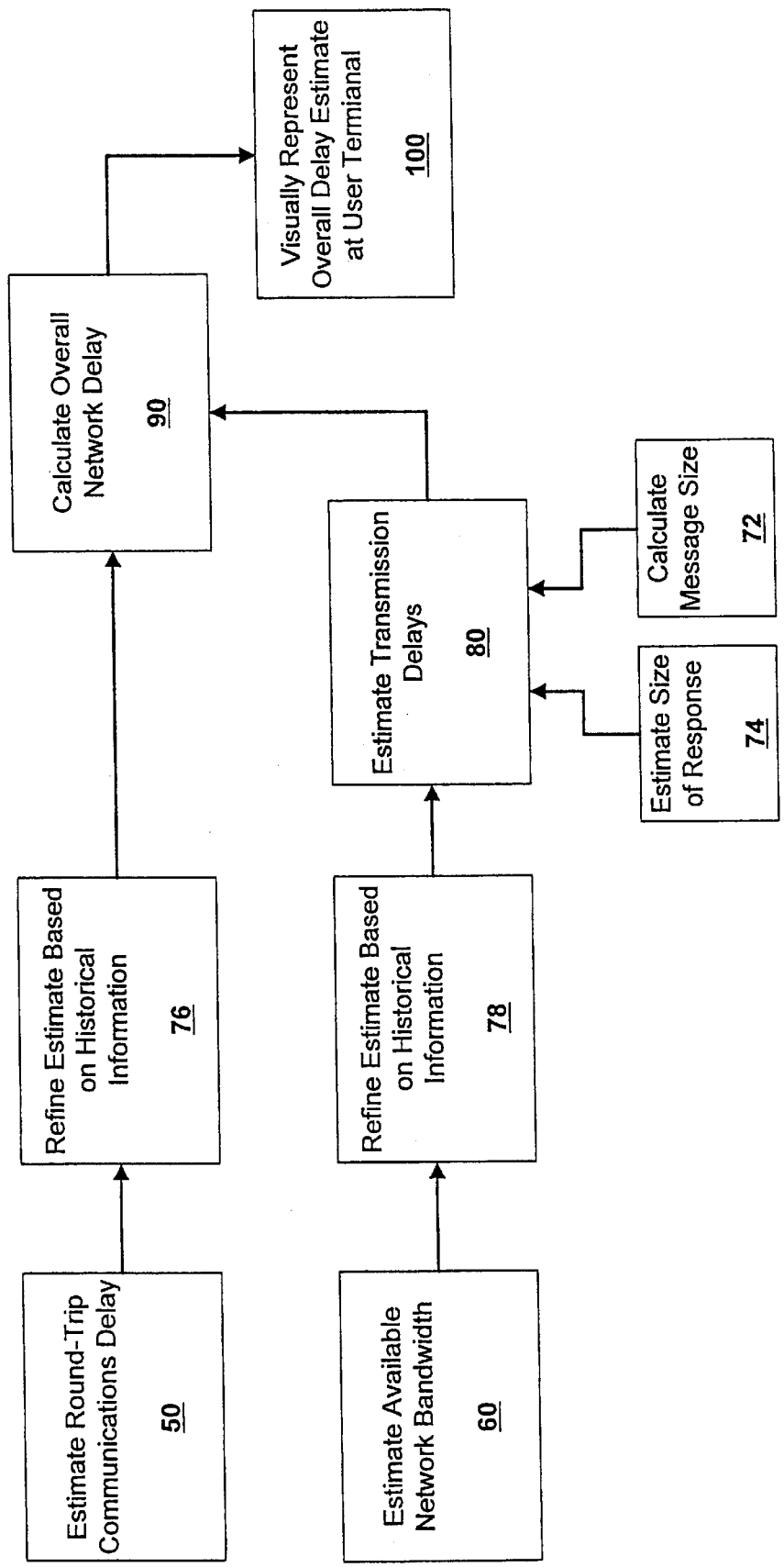
FIG. 5 is a flow chart describing operations of an alternative embodiment of the methods, systems and computer program products of the present invention.

As illustrated in FIG. 5, the instantaneous estimate of the round-trip communications delay (output from block 50) is provided to an averager (block 76). This averager could comprise a filter, a numerical averager, or any other known technique for linearly or exponentially smoothing an instantaneous estimate based on prior estimates. Similarly, the instantaneous estimate of the available bandwidth (output from block 60) is provided to a second averager (block 78), which similarly smooths the instantaneous bandwidth estimate based on prior estimates. In this manner, it may be possible to calculate overall delay based on a long-term representation of network characteristics.

Once an estimate of overall delay is calculated, this information is then provided to the user. As indicated above, users of data communication networks such as the Internet are typically uninformed regarding most, if not all, of the factors which may impact overall delay, such as the physical distance between the user and the site with which they are communicating, the capacity (i.e., bandwidth) of the network, the capabilities of the computer hardware (e.g., processors, modems, memory, etc.) which they are using and of the hardware located at the server, or the impact that the type of information that is being exchanged (e.g., video requires far more bandwidth than text). As such, they are likely to become frustrated when they send a request to a server and then for an extended period nothing happens. Generally, there is no feedback mechanism in place which even confirms for them that their request has been sent and is being processed, let alone a mechanism for providing them with an estimate of the overall delay expected with respect to the particular request that has been sent. Not only will this delay cause many users to question the reliability of network communications, in many instances users repeatedly send the same request mistaking the delay as an indication that their request was not successfully transmitted. Such an action not only wastes network resources, but also may further serve to enhance the perception of unreliability when the server responds to each of these identical requests. Accordingly, many of these potential users may perceive data communication networks as a generally unreliable form of communications which is not well suited to business communications.

Figure 6A:
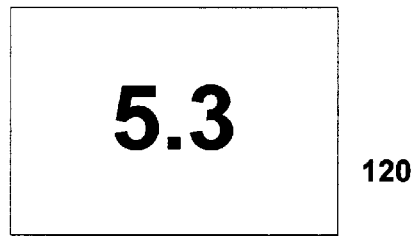
FIG. 6 depicts several potential ways of visually depicting overall network delay to network users.
Figure 6B:
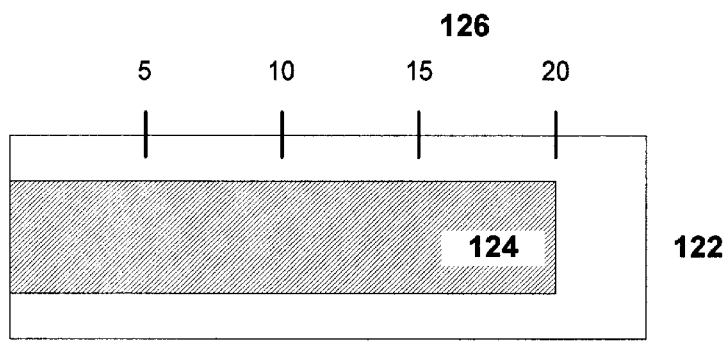
Figure 6C:
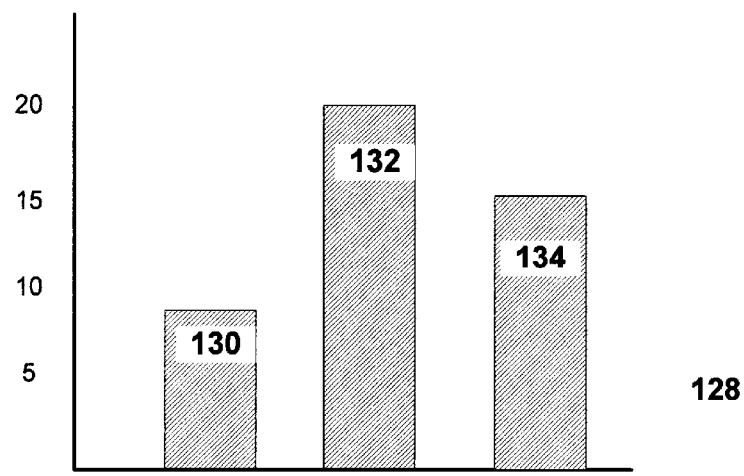

Pursuant to the teachings of the present invention, this problem may be reduced by calculating estimates of overall delay as described above, and then by visually representing this information to the user. As will be understood by those of skill in the art, numerical information such as overall delay information can be displayed to users in a wide variety of ways. FIG. 6 depicts illustrative examples. As shown in FIG. 6(a), one such method of visually representing overall delay information to a user is via a numerical display or indicator 120 which provides the user a numerical estimate of overall delay. FIG. 6(b) illustrates an alternative method, wherein the overall delay estimates are displayed using a meter 122. In this embodiment, the length of bar 124 in the meter 122 increases with increasing expected overall delay. In FIG. 6(b), the meter includes a scale 126 which indicates the actual estimate of overall delay. It will be appreciated, however, that such a scale is optional. FIG. 6(c) depicts still another potential implementation, wherein a graph 128 is used to depict the overall delay estimates. In this embodiment, both the current estimate of overall delay may be displayed (in FIG. 6(c) as the last bar 134 on the graph 128) as well as previous overall delay estimates 130, 132. Those of skill in the art will appreciate that a wide variety of graphs would be suitable for this purpose.

A variety of additional techniques for visually representing overall delay are depicted in FIG. 7. In FIG. 7(a), overall delay is depicted as a "virtual distance" by scaling two elements 136, 138, which in the example of FIG. 7(a) are trees. Thus, the larger the expected overall delay, the greater the difference in size of elements 136, 138. In FIG. 7(b), a virtual distance is depicted by the extent to which an element 140 is hidden or revealed. In an alternative embodiment, one or more filters could be implemented over element 140 to reduce its clarity with increasing overall delay, which once again indicates to a user that the virtual distance has increased. In FIG. 7(c), the line width of an element 142 is used to indicate the virtual distance, typically with decreasing line width indicating increasing virtual distance (and increasing expected overall delay). It will be understood that this virtual distance may be represented in a wide variety of other ways, such as by the color of the element or the level of abstraction used to represent the element.

Figure 7A:
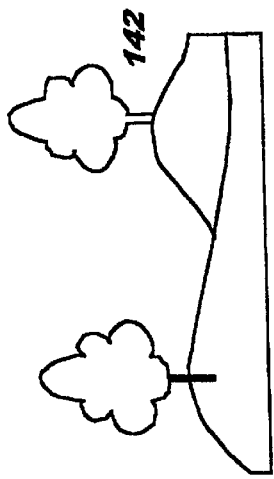
FIG. 7 depicts several additional potential ways of visually depicting overall network delay to network users.
Figure 7B:
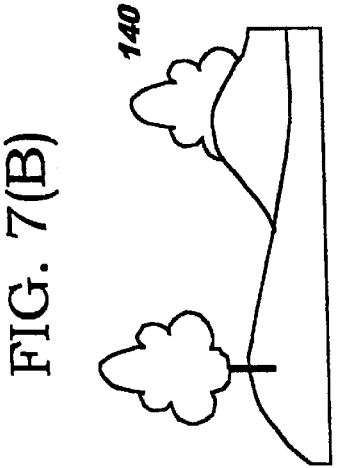
Figure 7C:
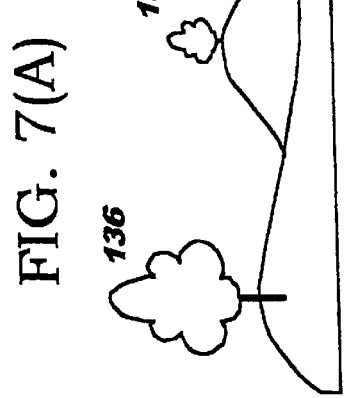
Figure 7D:
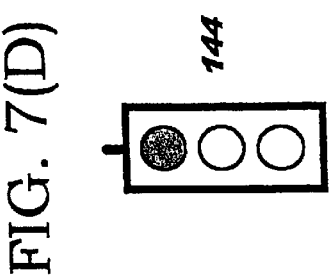
Figure 7E:
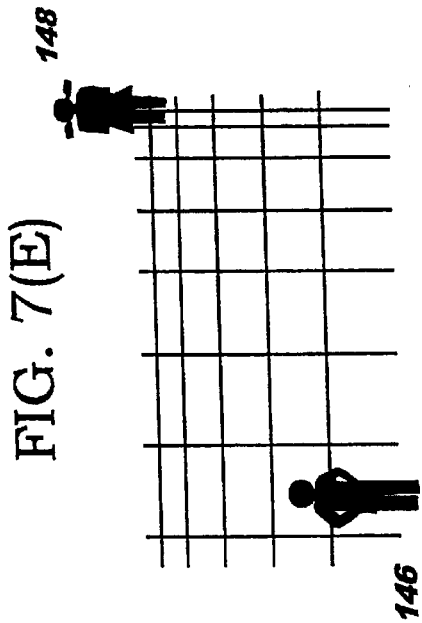

FIG. 7(d) shows still another embodiment, where a traffic light 144 is used with a green light indicating a short expected overall delay value, a yellow light depicting an intermediate expected overall delay value, and a red light depicting a large expected overall delay value. Various other embodiments could be implemented using "cultural" imagery such as the traffic light of FIG. 7(d), including gages, clocks, numerical counters or other indicators of distance or time. FIG. 7(e) depicts yet another potential method for visually depicting the overall delay information, where the spatial arrangement of two elements 146, 148 is used to depict the expected overall delay value.

Typically, a graphic user interface (GUI) is resident on the users terminal or computer, and the GUI is programmed or instructed to display the overall delay information in a particular format such as those illustrated in FIGS. 6 and 7. Those of skill in the art will understand that the examples in FIGS. 6 and 7 are merely intended to be illustrative, as a wide variety of other methods for displaying delay information exist. Accordingly, the present invention is not intended to be limited to those example representations depicted in FIGS. 6 and 7 and/or discussed herein, but instead is intended to encompass any method of visually providing users with information regarding overall delay.

In another embodiment of the present invention, the overall delay information may be visually represented to the user via use of a predefined set of overall delay indicators, each of which are used to represent overall delay estimates falling within a predefined range. In this embodiment, once the estimate of the overall delay is obtained, the system selects the one of the predefined overall delay indicators which corresponds to the estimated overall delay, and displays this indicator to the user. In this manner the network user is only provided a general indication of overall delay, which many users may prefer to actual estimates of overall delay.

As will be understood by those of skill in the art, the systems and computer program products of the present invention may be located at a wide variety of physical locations throughout the network. For instance, they could be located at one or more user terminals, at network servers, or at other network nodes or devices, or alternatively, could be distributed amongst two or more network elements. Similarly, it will also be understood that the methods, systems and computer program products of the present invention can be implemented in a wide variety of different ways. For instance, systems for determining and visually representing overall delay information can be implemented entirely in hardware, entirely in software, or in some combination of the two. It will further be understood that the systems of the present invention can be implemented to provide overall delay information to a variety of different subsets of network users. For instance, the system for estimating overall delay information could be resident in, or associated with, a particular server or network application, and accordingly would provide the overall delay information to all users accessing that server or application. Alternatively, the system could be established so as to provide overall delay to all network users, or could instead be resident at particular users and provide overall delay information to those users only.

Those of skill in the art will further understand that in at least some embodiments of the present invention, it may be desirable or necessary to have synchronized timing information at multiple locations in the network. For instance, in embodiments where network delays are estimated based on the delays measured in sending a message (one-way) from a user to another network site, the user and the network site must have synchronized timing in order to measure this delay. However, as such methods for synchronizing timing in communications systems are well known to those of skill in the art, they will not be discussed further herein.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for providing information about a user's communications with a site in a network, the method comprising the steps of:

determining an estimated overall delay value associated with the user's communications with the network site; and providing the user a visual representation of the estimated overall delay value;

wherein said determining step comprises the steps of:

estimating a round-trip delay value associated with the user's communications with the network site;

estimating a transmission delay value associated with the user's communications with the network site; and determining the estimated overall delay value based on the estimated round-trip delay value and the estimated transmission delay value.

2. The method according to claim 1, wherein said step of estimating a round-trip delay value comprises the steps of:

measuring a time required to send a message from the user to the network site to provide a first time value;

measuring a time required to send a message from the network site to the user to provide a second time value; and calculating the estimated round-trip delay value as the sum of the first time value and the second time value.

3. The method according to claim 1, wherein said step of estimating a round-trip delay value comprises the steps of:

sending a message from the user to the network site at a first time;

detecting at the user receipt of a response to the message from the network site at a second time; and estimating the round-trip delay value as the difference between the second time and the first time.

4. The method of claim 1, wherein the round-trip delay value is estimated based on an estimated propagation delay value and an estimated queuing delay value.

5. The method of claim 1, wherein the round-trip delay value is estimated based on an estimated propagation delay value, an estimated queuing delay value and an estimated processing delay value.

6. The method according to claim 1, wherein the step of providing the user a visual representation of the estimated overall delay value comprises the steps of:

generating an indicia corresponding to the estimated overall delay value; and displaying the indicia on the user's display device.

7. The method according to claim 2, wherein said step of estimating a transmission delay value comprises the steps of:

estimating at least one bandwidth value associated with the user's communications with the network site;

estimating a first message size associated with a communication which is to be transmitted from the user to the network site;

estimating a second message size associated with the response to the communication from the network site to the user;

estimating the transmission delay based on the at least one estimated bandwidth value, the estimated first message size and the estimated second message size.

8. The method according to claim 7, wherein said step of estimating at least one bandwidth value comprises the steps of:

transmitting a plurality of messages of various lengths from the user to the network site;

measuring a delay before receiving a response from the network site to each of the plurality of messages;

estimating a bandwidth available for the user's communications with the network site based on the differences in the measured delays associated with receiving the responses to the messages of various lengths.

9. The method according to claim 7, wherein said step of estimating at least one bandwidth value comprises the steps of:

transmitting a plurality of messages of various lengths from the user to the network site;

measuring a delay associated with sending each of the plurality of messages from the user to the network site;

estimating a first bandwidth value associated with communications from the user to the network site based on the differences in measured delays associated with sending the plurality of messages from the user to the network site;

transmitting a plurality of messages of various lengths from the network site to the user;

measuring a delay associated with sending each of the plurality of messages from the network site to the user;

estimating a second bandwidth value associated with communications from the network site to the user based on the differences in measured delays associated with sending the plurality of messages from the network site to the user.

10. The method according to claim 2, wherein said steps of estimating a round-trip delay value, estimating a transmission delay value and determining the estimated overall delay value are performed periodically.

11. The method according to claim 10, further comprising the step of adjusting each periodically determined estimated overall delay value based on an average of prior of the periodically determined estimated overall delay values.

12. A system for providing information about a user's communications with a site in a network, comprising:

means for determining an estimated overall delay value associated with the user's communications with the network site; and means for providing the user a visual representation of the estimated overall delay value;

wherein said determining means comprise:

means for estimating a round-trip delay value associated with the user's communications with the network site;

means for estimating a transmission delay value associated with the user's communications with the network site; and means for determining the estimated overall delay value based on the estimated round-trip delay value and the estimated transmission delay value.

13. The system according to claim 12, wherein said means for estimating a round-trip delay value comprise:

means for measuring a time required to send a message from the user to the network site to provide a first time value;

means for measuring a time required to send a message from the network site to the user to provide a second time value; and means for calculating the estimated round-trip delay value as the sum of the first time value and the second time value.

14. The system according to claim 12, wherein said means for estimating a round-trip delay value comprises:
   means for sending a message from the user to the network site at a first time;
   means for detecting at the user receipt of a response to the message from the network site at a second time; and
   means for estimating the round-trip delay value as the difference between the second time and the first time.

15. The method of claim 12, wherein the round-trip delay value is estimated based on an estimated propagation delay value and an estimated queuing delay value.

16. The method of claim 12, wherein the round-trip delay value is estimated based on an estimated propagation delay value, an estimated queuing delay value and an estimated processing delay value.

17. The system according to claim 12, wherein the means for providing the user a visual representation of the estimated overall delay value comprises:
   means for generating an indicia corresponding to the estimated overall delay value; and
   means for displaying the indicia on the user's display device.

18. The system according to claim 12, wherein said means for estimating a transmission delay value comprises:
   means for estimating at least one bandwidth value associated with the user's communications with the network site;
   means for estimating a first message size associated with a communication which is to be transmitted from the user to the network site;
   means for estimating a second message size associated with the response to the communication from the network site to the user;
   means for estimating the transmission delay based on the at least one estimated bandwidth value, the estimated first message size and the estimated second message size.

19. The system according to claim 18, wherein said means for estimating at least one bandwidth value comprise:
   means for transmitting a plurality of messages of various lengths from the user to the network site;
   means for measuring a delay before receiving a response from the network site to each of the plurality of messages;
   means for estimating a bandwidth available for the user's communications with the network site based on the differences in the measured delays associated with receiving the responses to the messages of various lengths.

20. The system according to claim 18, wherein said means for estimating at least one bandwidth value comprises:
   means for transmitting a plurality of messages of various lengths from the user to the network site;
   means for measuring a delay associated with sending each of the plurality of messages from the user to the network site;
   means for estimating a first bandwidth value associated with communications from the user to the network site based on the differences in measured delays associated with sending the plurality of messages from the user to the network site;
   means for transmitting a plurality of messages of various lengths from the network site to the user;
   means for measuring a delay associated with sending each of the plurality of messages from the network site to the user;
   means for estimating a second bandwidth value associated with communications from the network site to the user based on the differences in measured delays associated with sending the plurality of messages from the network site to the user.

21. The system according to claim 18, further comprising means for adjusting the estimated overall delay value based on an average of prior estimated overall delay values.

22. A computer program product for providing information about a user's communications with a site in a network, comprising:
   a computer-readable storage medium having computer-readable program code means embodied in said medium, said computer-readable program code means comprising:
   computer-readable program code means for determining an estimated overall delay value associated with the user's communications with the network site; and
   computer-readable program code means for providing the user a visual representation of the estimated overall delay value;
   wherein said computer-readable program code determining means comprise:
   computer-readable program code means for estimating a round-trip delay value associated with the user's communications with the network site;
   computer-readable program code means for estimating a transmission delay value associated with the user's communications with the network site; and
   computer-readable program code means for determining the estimated overall delay value based on the estimated round-trip delay value and the estimated transmission delay value.

23. The computer program product according to claim 22, wherein said computer-readable program code means for estimating a round-trip delay value comprise:
   computer-readable program code means for measuring a time required to send a message from the user to the network site to provide a first time value;
   computer-readable program code means for measuring a time required to send a message from the network site to the user to provide a second time value; and
   computer-readable program code means for calculating the estimated round-trip delay value as the sum of the first time value and the second time value.

24. The computer program product according to claim 22, wherein said computer-readable program code means for estimating a round-trip delay value comprises:
   computer-readable program code means for sending a message from the user to the network site at a first time;
   computer-readable program code means for detecting at the user receipt of a response to the message from the network site at a second time; and
   computer-readable program code means for estimating the round-trip delay value as the difference between the second time and the first time.

25. The method of claim 22, wherein the round-trip delay value is estimated based on an estimated propagation delay value and an estimated queuing delay value.

26. The method of claim 22, wherein the round-trip delay value is estimated based on an estimated propagation delay value, an estimated queuing delay value and an estimated processing delay value.

27. The computer program product according to claim 22, wherein the computer-readable program code means for providing the user a visual representation of the estimated overall delay value comprises:
  computer-readable program code means for generating an indicia corresponding to the estimated overall delay value; and
  computer-readable program code means for displaying the indicia on the user's display device.

28. The computer program product according to claim 22, wherein said computer-readable program code means for estimating a transmission delay value comprises:
  computer-readable program code means for estimating at least one bandwidth value associated with the user's communications with the network site;
  computer-readable program code means for estimating a first message size associated with a communication which is to be transmitted from the user to the network site;
  computer-readable program code means for estimating a second message size associated with the response to the communication from the network site to the user;
  computer-readable program code means for estimating the transmission delay based on the at least one estimated bandwidth value, the estimated first message size and the estimated second message size.

29. The computer program product according to claim 28, wherein said computer-readable program code means for estimating at least one bandwidth value comprise:
  computer-readable program code means for transmitting a plurality of messages of various lengths from the user to the network site;
  computer-readable program code means for measuring a delay before receiving a response from the network site to each of the plurality of messages;
  computer-readable program code means for estimating a bandwidth available for the user's communications with the network site based on the differences in the measured delays associated with receiving the responses to the messages of various lengths.

30. The computer program product according to claim 28, wherein said computer-readable program code means for estimating at least one bandwidth value comprises:
  computer-readable program code means for transmitting a plurality of messages of various lengths from the user to the network site;
  computer-readable program code means for measuring a delay associated with sending each of the plurality of messages from the user to the network site;
  computer-readable program code means for estimating a first bandwidth value associated with communications from the user to the network site based on the differences in measured delays associated with sending the plurality of messages from the user to the network site;
  computer-readable program code means for transmitting a plurality of messages of various lengths from the network site to the user;
  computer-readable program code means for measuring a delay associated with sending each of the plurality of messages from the network site to the user;
  computer-readable program code means for estimating a second bandwidth value associated with communications from the network site to the user based on the differences in measured delays associated with sending the plurality of messages from the network site to the user.

31. The computer program product according to claim 28, further comprising computer-readable program code means for adjusting the estimated overall delay value based on an average of prior estimated overall delay values.

32. A method of displaying information to a user of a first data processing system that communicates with a second data processing system over a communications network, the method comprising:
  displaying an overall delay indicator associated with communications between the first data processing system and the second data processing system, wherein the communications are originated by an application executing on the first data processing system and wherein the overall delay indicator is displayed so as to provide a user of the application executing on the first data processing system an indicator of expected communications delay for communications originated by the application executing on the first data processing system, wherein the displaying step comprises the steps of:
  providing a predefined set of overall delay indicators;
  obtaining an estimate of overall delay associated with communications, originated by the application, from the first data processing system to the second data processing system;
  selecting one of the predefined set of overall delay indicators based on the obtained overall delay estimate; and
  displaying the selected one of the predefined set of overall delay indicators on a display device associated with the first data processing system.

33. The method of claim 32, wherein the step of obtaining an estimate of overall delay comprises the steps of:
  estimating a round-trip delay value associated with the first data processing system's communications with the second data processing system;
  estimating a transmission delay value associated with the first data processing system's communications with the second data processing system; and
  estimating overall delay based on the estimated round-trip delay value and the estimated transmission delay value.

34. A system for displaying information to a user of an application executing on a first data processing system, wherein the first data processing system communicates with a second data processing system over a communications network, the system comprising:
  means for determining an expected communications delay between the first data processing system and the second data processing system for communications originated by the application executing on the first data processing system; and
  means for displaying an indicator of the expected delay for communications, wherein the displaying means comprises:
  means for providing a predefined set of overall delay indicators;
  means for obtaining an estimate of overall delay associated with communications, originated by the application, from the first data processing system to the second data processing system;
  means for selecting one of the predefined set of overall delay indicators based on the obtained overall delay estimate; and means for displaying the selected one of the predefined set of overall delay indicators on a display device associated with the first data processing system.

35. The system of claim 34, wherein the obtaining means comprises:

means for estimating a round-trip delay value associated with the first data processing system's communications with the second data processing system;

means for estimating a transmission delay value associated with the first data processing system's communications with the second data processing system; and means for estimating overall delay based on the estimated round-trip delay value and the estimated transmission delay value.

36. A computer program product for displaying information to a user of a first data processing system, wherein the first data processing system communicates with a second data processing system over a communications network, comprising:

a computer-readable storage medium having computer-readable program code means embodied in said medium, said computer-readable program code means comprising:

computer-readable program code means for displaying an overall delay indicator associated with communications between the first data processing system and the second data processing system, wherein the communications are originated by an application executing on the first data processing system and wherein the overall delay indicator is displayed so as to provide a user of the application executing on the first data processing system an indicator of expected communications delay for communications originated by the application executing on the first data processing system, wherein the computer-readable program code means for displaying a latency indicator comprises:

computer-readable program code means for providing a predefined set of overall delay indicators;

computer-readable program code means for obtaining an estimate of overall delay associated with communications, originated by the application, from the first data processing system to the second data processing system;

computer-readable program code means for selecting one of the predefined set of overall delay indicators based on the obtained overall delay estimate; and computer-readable program code means for displaying the selected one of the predefined set of overall delay indicators on a display device associated with the first data processing system.

37. The computer program product of claim 36, wherein the computer-readable program code means for obtaining an estimate of overall delay comprises:

computer-readable program code means for estimating a round-trip delay value associated with the first data processing system's communications with the second data processing system;

computer-readable program code means for estimating a transmission delay value associated with the first data processing system's communications with the second data processing system; and computer-readable program code means for estimating overall delay based on the estimated round-trip delay value and the estimated transmission delay value.

\* \* \* \* \*

UNITED STATES PATENT AND TRADEMARK OFFICE
CERTIFICATE OF CORRECTION

PATENT NO.    : 6,272,539 B1
DATED         : August 7, 2001
INVENTOR(S)   : Gennaro A. Cuomo et al.

It is certified that error appears in the above-identified patent and that said Letters Patent is hereby corrected as shown below:

Column 16,
Line 35, please change "according to claim 2" to -- according to claim 1 --.

Signed and Sealed this

Twenty-eighth Day of May, 2002

Attest:

JAMES E. ROGAN
*Attesting Officer*     *Director of the United States Patent and Trademark Office*